United States Patent
Kaya et al.

[11] Patent Number: 5,265,017
[45] Date of Patent: Nov. 23, 1993

[54] SYSTEM FOR CONTROLLING FLUID COUPLING FOR ACCELERATION OF AUTOMATIC TRANSMISSION

[75] Inventors: Mamoru Kaya; Yoshiharu Ueki, both of Hiroshima, Japan

[73] Assignee: Mazda Motor Corporation, Hiroshima, Japan

[21] Appl. No.: 660,847

[22] Filed: Feb. 26, 1991

[30] Foreign Application Priority Data
Feb. 27, 1990 [JP] Japan .................... 2-48148

[51] Int. Cl.$^5$ .................. B60K 41/02; B60K 41/06
[52] U.S. Cl. .................. 364/424.1; 192/0.052; 74/866
[58] Field of Search .............. 364/424.1, 431.04, 566; 192/0.076, 0.096, 3.3, 3.31, 0.032, 0.034, 0.052, 0.077, 0.075, 0.092; 74/882, 862, 866; 73/118.1, 861.62, 492, 498, 511, 514, 531, 540

[56] References Cited

U.S. PATENT DOCUMENTS

| | | | |
|---|---|---|---|
| 4,658,640 | 4/1987 | Kido et al. ............... | 73/118.2 |
| 4,679,674 | 7/1987 | Sakakiyama ............. | 192/0.052 |
| 4,831,987 | 5/1989 | Nakaniwa et al. ........ | 123/488 |
| 4,841,815 | 6/1989 | Takahashi ................ | 364/424.1 |
| 4,984,552 | 1/1991 | Nishizawa et al. ........ | 123/492 |
| 5,018,408 | 5/1991 | Bota et al. ................. | 74/866 |
| 5,046,383 | 9/1991 | Butts et al. ................ | 74/862 |
| 5,079,972 | 1/1992 | Iizuka ....................... | 74/865 |
| 5,115,896 | 5/1992 | Noguchi et al. .......... | 192/0.052 |
| 5,115,897 | 5/1992 | Yoshimura et al. ....... | 192/0.052 |
| 5,133,232 | 7/1992 | Kikuchi et al. ........... | 74/890 |

*Primary Examiner*—Thomas G. Black
*Assistant Examiner*—Tan Q. Nguyen
*Attorney, Agent, or Firm*—Keck, Mahin & Cate

[57] ABSTRACT

An automotive engine acceleration judging device sets threshold levels according to engine loads and engine speeds, respectively, so as to detect that the automotive engine is under acceleration when fluctuation levels in engine load are high, i.e., beyond at least one of the threshold levels. The engine load dependent threshold level is higher than the engine speed dependent threshold level, and each threshold level is changed so as to be higher when the engine operates at higher loads than when it operates at lower loads. When the acceleration judging device decides an acceleration of the engine is present, a lockup clutch of an automatic transmission with a fluid coupling is released to unlock the fluid coupling to at least allow slippage.

8 Claims, 3 Drawing Sheets

SYSTEM FOR CONTROLLING FLUID COUPLING FOR ACCELERATION OF AUTOMATIC TRANSMISSION

BACKGROUND OF THE INVENTION

1. Field of the Invention

The present invention relates to a device for judging acceleration of an automotive engine, and to a control system using the acceleration judging device for controlling a fluid coupling of an automotive automatic transmission.

2. Description of Related Art

To determine the acceleration of an automotive engine, it is well known to use a specific reference value for judging when acceleration of the engine occurs. When a level of engine load increases beyond the specific value, the engine is judged to be in acceleration. Upon the detection of acceleration of the engine, a lockup clutch is released to unlock a fluid coupling of an automatic transmission, such as a torque converter, so that the torque converter allows slippage and permits the engine torque to multiply with high performance, thereby allowing the engine to accelerate quickly. An acceleration judging device, or system, of this kind is known from, for instance, Japanese patent application No. 56-134508, entitled "Control System For Automatic transmission with Direct Coupling Clutch," filed on Aug. 27, 1981 and published as Japanese Unexamined Patent Publication No. 58-37368 on Mar. 4, 1983.

When an engine operated element, such as an air conditioner, is in use, the engine is subjected to higher, or heavier, loads. For this reason, it is necessary for a driver of the vehicle to depress, or push down, an accelerator pedal more deeply when the air conditioner is in use than when it is not in use in order to speed the vehicle up at the same acceleration rate, even if the vehicle is running at the same speed. However, if the value for the judgement of acceleration is set to a higher value, suitable for engine operating conditions during times when the air conditioner is in use, the value becomes too high to properly judge the acceleration of engine when the air conditioner is not in use. On the other hand, if the acceleration value judgement value is set to a lower value, suitable for engine operating conditions during times when the air conditioner is not in use, the value becomes too low. If the acceleration judgment value is too low, frequently, the control system will misjudge the acceleration of the engine, and detect an acceleration, even though the engine is not actually in acceleration, while the air conditioner is in use. Accordingly, it is likely that the lockup torque converter, which is adapted to be unlocked during acceleration, will multiply engine torque uncertainly sometimes during an acceleration of the engine. This results in having the engine undesirably accelerate at different rates under various operating conditions. This is true, for instance, for an engine which is subjected to loads from a power steering system or to fluctuations, or changes, in engine load caused from, for instance, a sloped road.

SUMMARY OF THE INVENTION

The primary object of the present invention is to provide an acceleration judging device which judges exactly the acceleration of an automotive engine.

It is another object of the present invention to provide a fluid coupling control device with an acceleration detecting device which uncouples, or unlocks, a fluid coupling, such as a torque converter of an automatic transmission, during acceleration.

The object of the present invention is achieved by providing an engine acceleration judging device for judging acceleration of an automotive engine. The device includes judging means for setting a threshold level so as to judge when the automotive engine is under acceleration when a fluctuation in engine operating conditions, such as engine loads and engine speeds, is beyond a threshold level of fluctuation. The device also includes control means for causing the judging means to change the threshold level according to the engine loads.

Fluctuation in engine loads is detected by monitoring the opening of a throttle valve or a rate of change in opening of the throttle valve by, for instance, a throttle opening sensor.

In a specific embodiment, the judging means sets two different threshold levels according to engine operating conditions. A first threshold level is set according to engine loads, and a second threshold level is set according to engine speeds. The second threshold level is lower than the first threshold level.

The engine acceleration judging device is used to control an automotive transmission, having a fluid coupling, such as a torque convertor, equipped with a lockup clutch which locks up the fluid coupling at least when the automotive transmission is placed in a drive range. The engine acceleration judging device, when it determines that the automotive engine is accelerating, causes clutch control means to control the lockup clutch to allow the fluid coupling to produce slippage.

The judging means causes the threshold level to be lower when an engine operated element, such as an air conditioner, a power steering system, etc., is not being used than when the element is used. The lower threshold level makes it possible to detect with certainty an acceleration of the engine when an accelerator pedal is pushed down. On the other hand, the threshold level is caused by the judging means to be higher, for instance, when the engine operated element is used, or when the vehicle runs up a slope. Consequently, an erroneous determination that a depression of the accelerator pedal is made for acceleration is avoided.

When the judging means detects an acceleration of the engine, the lockup clutch is controlled so as to either completely unlock the fluid coupling or to unlock the fluid coupling sufficiently to allow slippage. Accordingly, when the engine is accelerated, the fluid coupling performs its torque multiplication feature properly.

BRIEF DESCRIPTION OF THE DRAWINGS

Still other objects of the invention and more specific features will become apparent to those skilled in the art from the following description of the preferred embodiments when considered together with the accompanying drawings, in which.

DESCRIPTION OF THE PREFERRED EMBODIMENTS

Because an automatic transmission with a lockup torque converter is, in general, well known, the present description will be directed, in particular, to elements forming parts of, or cooperating directly with, a lockup torque converter with a acceleration detector system in accordance with the present invention. It is to be understood that elements not specifically shown or described can take various forms well known to those skilled in the automatic transmission art.

Figure 1:
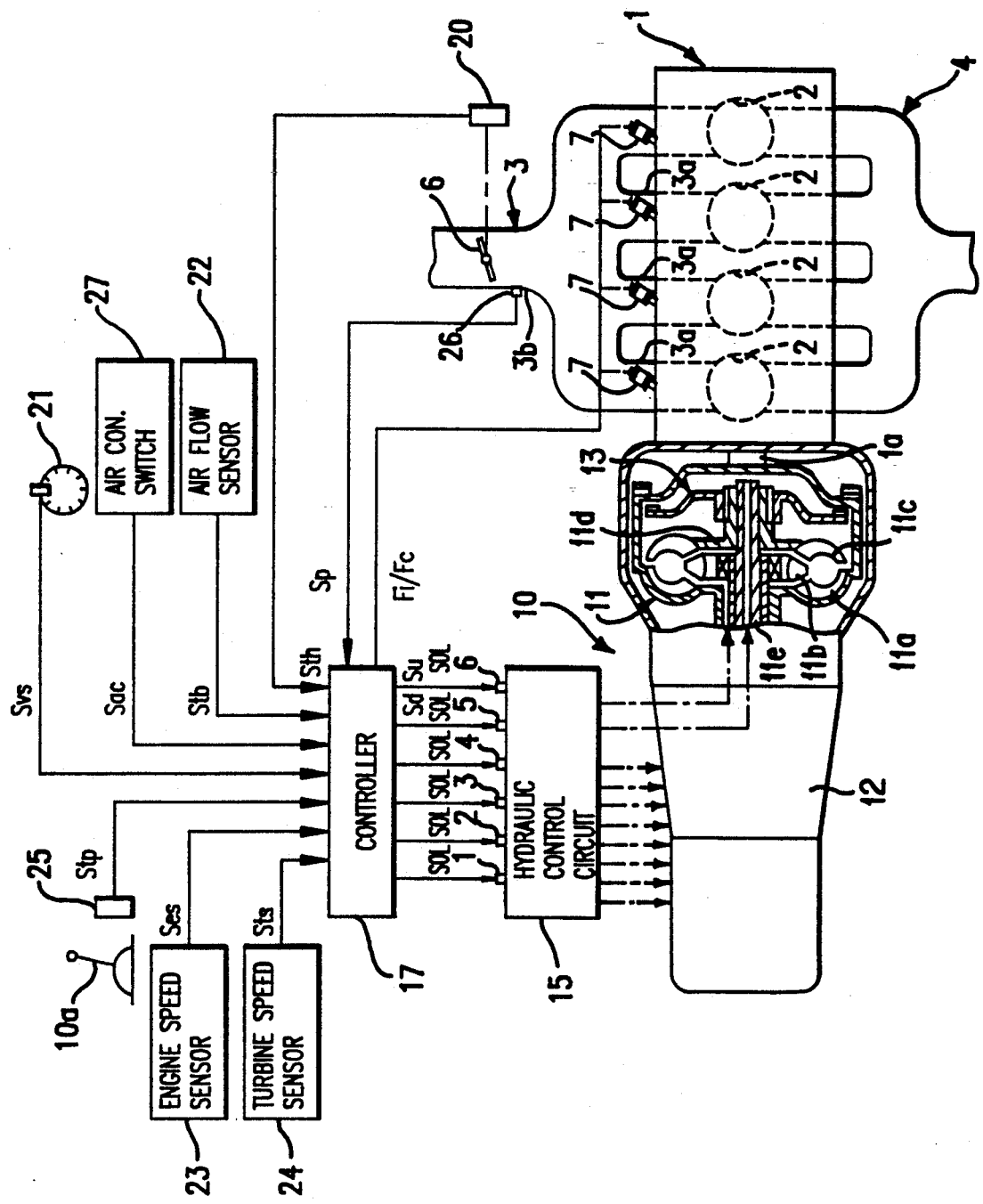
FIG. 1 is a schematic view showing an engine controlled by a fluid coupling control system in accordance with a first preferred embodiment of the present invention.

Referring to the drawings in detail, and particularly to FIG. 1, an internal combustion engine 1 with an automatic transmission 10 is shown. The engine 1 is formed with a plurality of, for example four, cylinders 2 arranged in a straight row. Intake air is introduced into the respective cylinders 2 through an intake system 3, including an intake manifold 3b and discrete intake pipes 3a. The amount of intake air is regulated by a throttle valve 6 disposed in the manifold 3b. Gasoline is distributed into the cylinders 2 by fuel injectors 7 disposed in the discrete intake pipes 3a, mixed with the intake air, and compressed and fired in the cylinders 2. Exhaust gas is discharged from the engine 1 through exhaust pipe 4.

Automatic transmission 10 comprises a torque converter 11 connected to an output shaft 1a of the engine 1 and a transmission gear 12, which can be placed in any desired one of, for instance, four forward and one reverse gears. The torque converter 11 comprises a pump 11a coupled to the engine output shaft 1a, a stator 11b, turbine 11c and a one-way clutch 11d disposed between the stator 11b and turbine 11c. The transmission gear 12 is operationally coupled to the turbine 11c by way of an output shaft 11e of the torque converter 11. The torque converter 11 is equipped with a lockup clutch 13 that releasably locks the engine output shaft 1a and converter output shaft 11e together.

Automatic transmission 10, comprising the transmission gear 12 and torque converter 11, is controlled by a hydraulic control circuit 15 including various control valves, such as shift control solenoids SOL1-SOL5 and a lockup control duty solenoid SOL6. All of these control solenoids SOL1-SOL6 are controlled by an electronic controller 17, basically comprising a microcomputer.

For controlling the automatic transmission 10, including the torque converter 11 with the lockup clutch 13, the microcomputer of controller 17 has stored therein control map data for shift control of the transmission, fuel cut control of the injectors 7, and lockup control of the lockup clutch 13.

Controller 17 controls the shift control solenoids SOL1-SOL6 according to vehicle operating conditions, such as a throttle opening, a vehicle speed, the intake rate or amount of intake air, an engine speed, a turbine speed, a shift-lever position, an intake air pressure and the use of an air conditioner. Such vehicle operating conditions are detected by and sent, as electric signals Sth, Svs, Stb, Ses, Sts, Sp, Stp and Sac, to the controller 17 from various sensors and switches, such as a throttle position sensor 20 for detecting operated positions of the throttle valve 6 that represent engine loads, a vehicle speed sensor 21, an air flow sensor 22, an engine speed sensor 23, a turbine speed sensor 24, transmission shift lever position sensor 25 provided in cooperation with a shift lever 10a of the transmission 10, a pressure sensor 26 for detecting the negative pressure of intake air in the intake manifold 3b, and an air conditioner switch 27 that sends an appropriate signal Sac indicting that an air conditioner of the vehicle is in operation. Because these sensors and switches 21-27 are well known in structure and operation to those skilled in the art, they are not described in detail herein.

Controller 17 provides the shift control solenoids SOL1-SOL5 with shift control signals, respectively, when the vehicle is determined to be operating in the range of upshifting conditions or downshifting conditions, thereby selectively actuating, or energizing, the shift control solenoids SOL1-SOL5 so as to cause the automatic transmission 10 to shift itself into desired ranges.

Controller 17 further provides the injectors 7 with a fuel injection signal Fi to control the injectors so that they inject an appropriate amount of fuel according to the amount of intake air introduced into the intake system. The controller 17, on the other hand, provides the injectors 7 with a fuel cut signal Fc so as to suspend the injection of fuel from the injectors 7 when it judges, based on signals representative of the throttle position and engine speed, that the vehicle is in deceleration.

Controller 17 provides the lockup control duty solenoid SOL6 with a duty control signal Sd, when the vehicle is in the definite range of slip control conditions, so that the lockup clutch 13 allows the torque converter 11 to allow slippage between the turbine and pump, as well as with a lockup signal Su, when the vehicle is in the definite range of lockup conditions, so that the lockup clutch 13 locks up the torque converter 11 and forces it to operate as a solid drive unit with no slippage between the turbine and pump.

Lockup clutch 13 is released to unlock the torque converter 11 when the vehicle is in acceleration. The unlock operation of the torque converter 11 is understood by reviewing FIG. 2, which is a flow chart illustrating an unlock routine for the microcomputer of the controller 17. Programming a computer or microcomputer is a skill well understood in the art. The following description is written to enable a programmer having ordinary skill in the art to prepare an appropriate program for the microcomputer of the controller 17. The particular details of any such program would, of course, depend upon the architecture of the particular computer selected.

Figure 2:
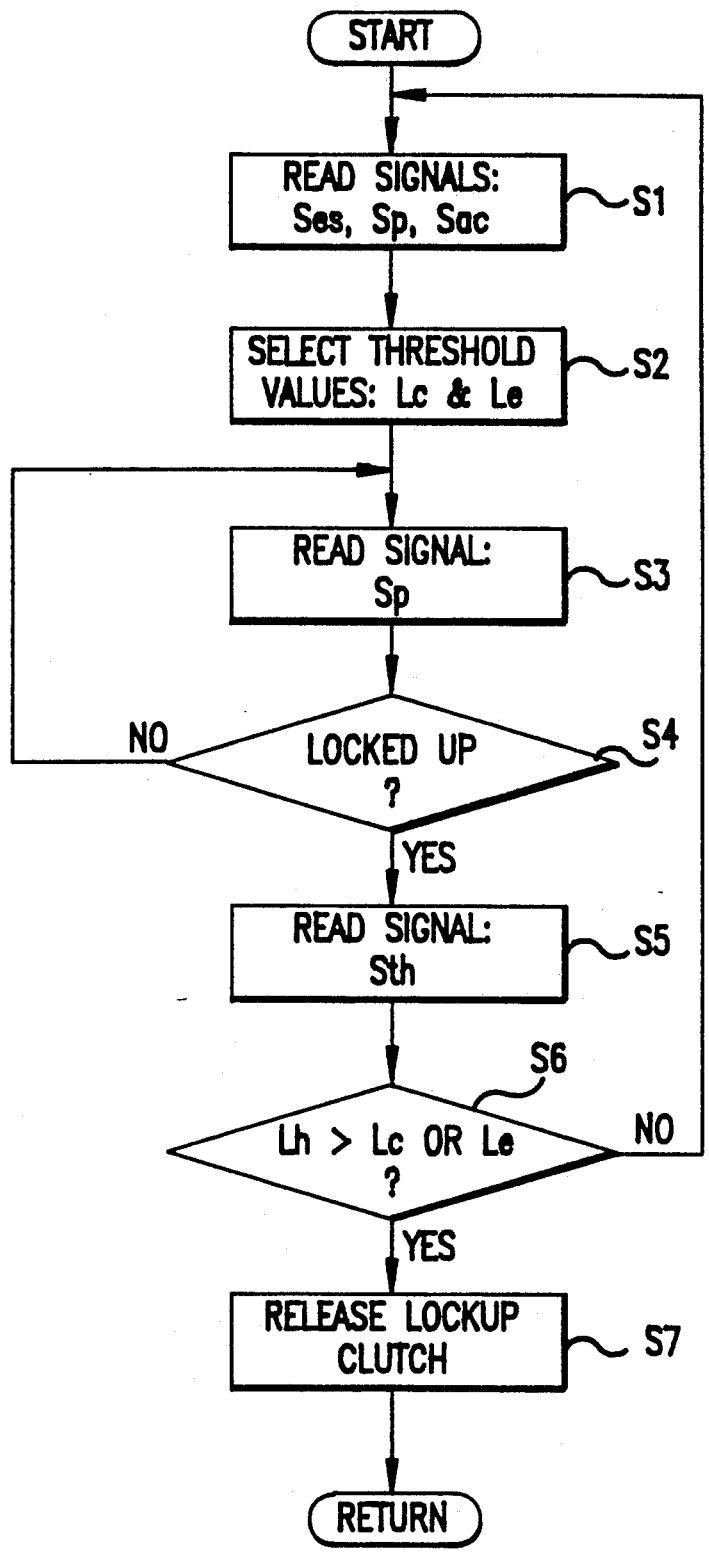
FIG. 2 is a flow chart illustrating an operational sequence for a microcomputer which controls operations of an automatic transmission with a lockup torque converter.
Figure 3:
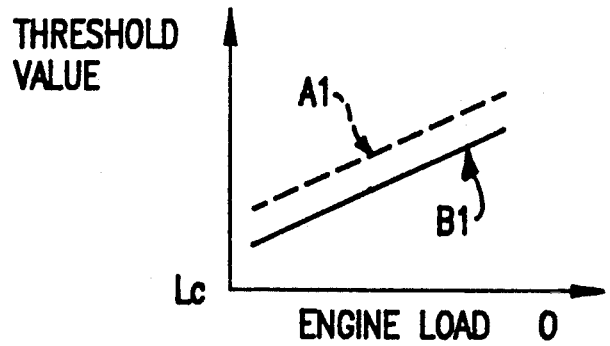
FIG. 3 is a map used to determine a threshold level of fluctuation of engine load according to engine loads.
Figure 4:
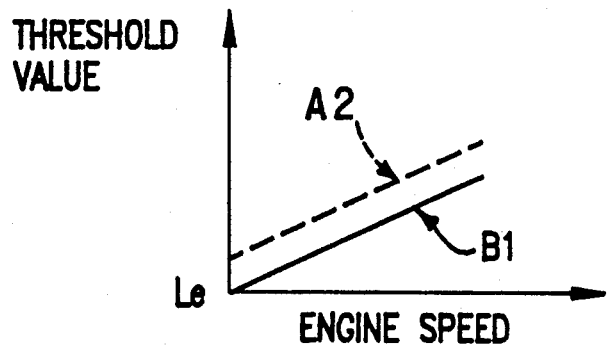
FIG. 4 is a map used to determine a threshold level of fluctuation of engine load according to engine speeds.

Referring to FIG. 2, after starting the vehicle, the first step is to read signals Ses, Sp and Sac from the engine speed sensor 23, pressure sensor 26 and air conditioner switch 27, respectively, at step S1 in order to determine, in step S2, threshold values Lc and Le, according to negative pressure in the intake manifold 3b of the intake system 3 and engine speed, respectively, from maps shown in FIGS. 3 and 4, respectively, for a decision concerning acceleration. Threshold values Lc and Le are read, either from predetermined lines A1 and A2 when the air conditioner is in operation or from predetermined lines B1 and B2 when the air conditioner is not in operation. As is recognized by those skilled in the art, the precise slope and relative location of lines A1, A2, B1 and B2 may be empirically determined. After reading a signal Sp, representative of the operated, shifted, position of the transmission, from the transmission shift lever position sensor 25 at step S3, a decision is made at step S4 to determine the state in which the lockup clutch 13 is. More specifically, controller 17 judges if the lockup clutch 13 is in a locking condition, which term is used to refer both to states in which the lockup clutch 13 locks up the torque converter 11 when solenoid SOL6 is provided with the lockup signal Su and in which the lockup clutch 13 locks the torque converter 11, but allows it to slip, when solenoid SOL6 is provided with a duty control signal Sd. The controller 17 judges that the lockup clutch 13 has been released, or is not in the locking state, so as to unlock the torque converter 11 when the controller 17 does not provide the lockup solenoid SOL6 with any signal. Until the lockup clutch 13 is changed into the locking state, or as long as the answer to the decision at step S4 is no, the decision regarding the locking condition of the lockup clutch 13 is repeated.

If the answer to the decision at step S4 is yes, this indicates that the lockup clutch 13 is in the locking state. Then, after reading a signal Sth, representative of the opening Th of the throttle valve 6, from the throttle position sensor 20 at step S5, a final decision is made at step S whether the throttle opening Lh is larger than either one of the threshold openings Lc and Le. When the throttle opening Lh is lower than both the threshold openings Lc and Le, the controller 17 determines that the vehicle is not in acceleration, and then repeats steps S through S6. On the other hand, when the throttle opening Lh is larger than either one of the threshold openings Lc and Le, the controller 17 determines that the engine is in acceleration and interrupts the lockup signal Su or duty control signal Sd to release the lockup clutch 13 in order to unlock the torque converter 11.

When the air conditioner is not used, the controller 17 reads the threshold values Lc and Le from the lines B1 and B2 represented in FIGS. 3 and 4. Because of the non-use the air conditioner, values Lc and Le are, therefore, lower than those values read for the engine operating conditions during which the air conditioner is used, as is clear from FIGS. 3 and 4. As a result, when the throttle valve 6 increases its opening Lh beyond either one of the threshold values Lc and Le when the accelerator pedal is depressed for acceleration, the acceleration of the engine is detected with certainty.

Although the controller 17 detects the same engine speed and pressure when the air conditioner is used as when the air conditioner is not used, the driver typically must depress the accelerator pedal more deeply, for the same acceleration, when using the air conditioner than when not using the air conditioner. Also, the throttle valve 6 will typically be opened beyond the threshold values so that the throttle valve opening Lh is greater than these threshold values Lc and Le, read from the lines B1 and B2, during non-use of air conditioner, since often, the accelerator pedal is depressed by the driver a little too much. However, since the controller 17 changes the threshold values Lc and Le, read from the lines B1 and B2 during non-use of the air conditioner, to values read from the lines A1 and A2 during use of air conditioner the opening Lh of the throttle valve 6 does not go improperly beyond either one of the threshold values Lc and Le. This ensures that the controller 17 will make a correct judgement of acceleration in any condition.

Due to the correct judgement of acceleration, the torque converter 11 is unlocked with certainty during acceleration, so as to multiply and transmit engine torque correctly from the engine 1 to the transmission 10, and thereby to allow the engine 1 to accelerate the vehicle rapidly and consistently.

Figure 5:
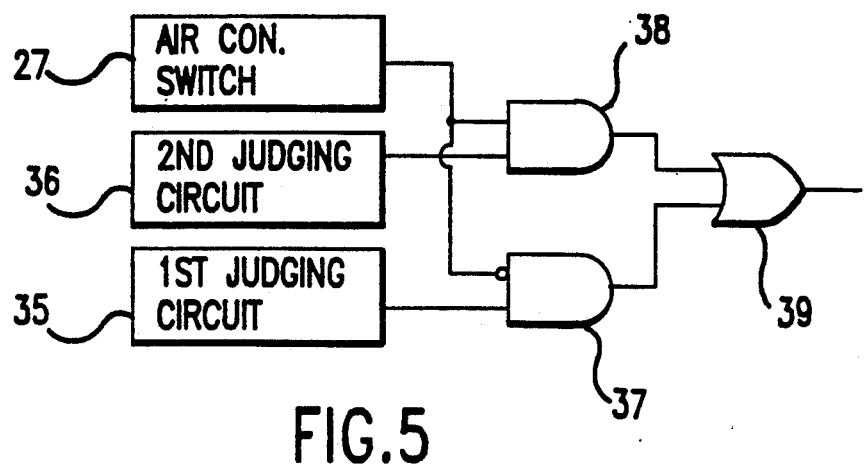
FIG. 5 is a schematic block diagram of a fluid coupling control system in accordance with another preferred embodiment of the present invention.

Referring to FIG. 5, showing a device for detecting acceleration in accordance with another preferred embodiment of the present invention, it can be seen that the device includes first and second judging circuits 35 and 36 for acceleration judgement. The first judging circuit 35 provides a high level signal, indicating that the opening Lh of the throttle valve is beyond the threshold value Lc or Le, read from the lines B1 or B2 during non-use of the air conditioner. Similarly, the second judging circuit 36 provides a high level signal, indicating that the opening Lh of the throttle valve is beyond the threshold value Lc or Le, read from the lines A1 or A2 during use of the air conditioner.

The acceleration detecting device further comprises first and second AND gates 37 and 38. The first AND gate 37, when it receives an off-signal of a high level, which is provided when the air conditioner is not in use or the air conditioner switch 27 is turned off, and the high level acceleration signal from the first judging circuit 36, provides an acceleration signal. The second AND gate 38, when it receives an on-signal of high level, which is provided when the air conditioner is in use or the air conditioner switch 27 is turned on, and the high level signal from the second judging circuit 37, also provides an acceleration signal. An OR gate 39 is connected to both the first and second AND gates 37 and 38 so as to provide an unlock signal when receiving at least one of the acceleration signals from the first and second AND gates 37 and 38. When the unlock signal is provided, the controller 17 interrupts the lockup signal Su or duty control signal Sd to release the lockup clutch 13 in order to unlock the torque converter 11.

In spite of completely unlocking the torque converter 13, it may be possible to change a duty rate at which the duty solenoid SOL6 is operated so as to allow the torque converter 13 to permit desired slippage. Furthermore, the air conditioner switch 27 may be replaced with, or combined with, a switch that provides a signal when a speed responsive power steering system is in operation. In addition, in place of detecting the opening of the throttle valve, a changing rate of opening of throttle valve may be detected for acceleration judgement.

It is to be understood that although the invention has been described in detail with respect to preferred embodiments thereof, nevertheless, various other embodiments and variants are possible which are within the spirit and scope of the invention, and such other embodiments and variants are intended to be covered by the following claims.

What is claimed is:

1. A control system for controlling an automotive transmission, equipped with a fluid coupling, of an automotive engine, the fluid coupling being equipped with a lockup clutch which locks up the fluid coupling at least when the automotive transmission is placed in a drive range, said control system comprising:

acceleration judging means for judging acceleration of the automotive engine, said acceleration judging means including element detecting means for detecting an operation of an engine operated element, operating condition detecting means for detecting operating conditions in which the automotive engine operates, fluctuation detecting means for detecting fluctuations in said operating conditions detected by said operating condition detecting means, and judging means for setting a threshold level according to the operation of said engine operated element so as to judge that the automotive engine to be under acceleration when said fluctuation is beyond said threshold level;

clutch control means for controlling the lockup clutch so as to allow the fluid coupling to produce slippage when said acceleration judging means judges that the automotive engine is in acceleration; and control means for causing said judging means to change said threshold level according to said operating conditions.

2. A control system for controlling an automotive transmission, equipped with a fluid coupling, of an automotive engine, the fluid coupling being equipped with a lockup clutch which locks up the fluid coupling at least when the automotive transmission is placed in a drive range, said control system comprising:

acceleration judging means for judging acceleration of the automotive engine, said acceleration judging means including element detecting means for detecting an operation of an engine operated element, operating condition detecting means for detecting operating conditions, including engine loads and engine speeds, in which the automotive engine operates, fluctuation detecting means for detecting fluctuations in magnitude of said engine loads detected by said operating condition detecting means, judging means for setting threshold levels according to said engine loads and engine speeds detected by said operating condition detecting means and the operation of said engine operated element detected by said element detecting means so as to judge that the automotive engine to be under acceleration when said fluctuation is beyond said threshold levels;

clutch control means for controlling the lockup clutch so as to allow the fluid coupling to produce slippage when said acceleration judging means judges that the automotive engine is in acceleration; and control means for causing said judging means to change said threshold levels according to said operating conditions.

3. A device as recited in claim 2, wherein said judging means sets the threshold level according to said engine loads higher than the threshold level according to said engine speeds.

4. A device as recited in claims 3, wherein said operating condition detecting means comprises pressure detecting means for detecting a negative pressure created by a throttle valve of the engine.

5. A device as recited in claim 2, wherein said element detecting mans comprises a sensor for detecting an operation of an air conditioner.

6. A device as recited in claim 2, wherein said element detecting means comprises a sensor for detecting an operation of a power steering system.

7. A device as recited in claim 2, wherein said fluctuation detecting means comprises means for detecting changes in a throttle opening of a throttle valve of the engine.

8. A device as cited in claim 2, wherein said fluctuation detecting means comprises means for detecting rates of change in a throttle opening of a throttle valve of the engine.

* * * * *